April 19, 1966     W. J. WHARTON ET AL     3,246,595
PICKLE INJECTOR
Filed May 19, 1961     7 Sheets-Sheet 1
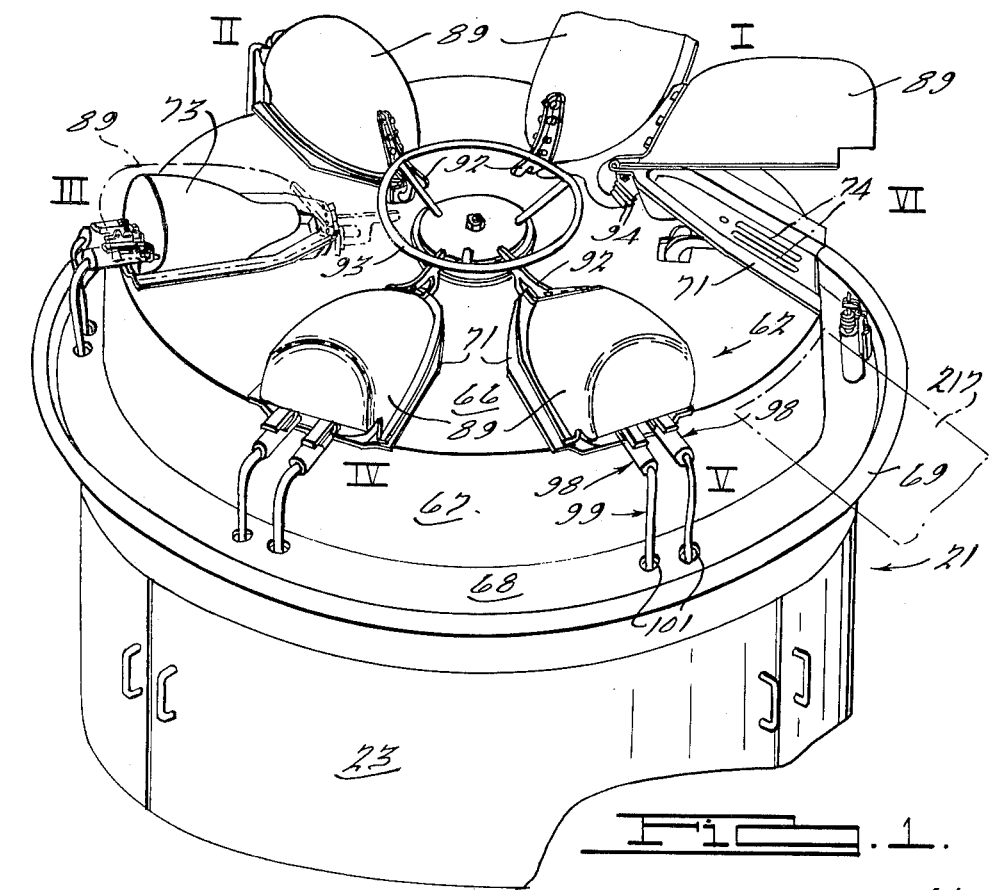
INVENTORS
Walter J. Wharton
Norman H. Vogt
Henry A. Schuricht
BY Harness, Dickey & Pierce
ATTORNEYS

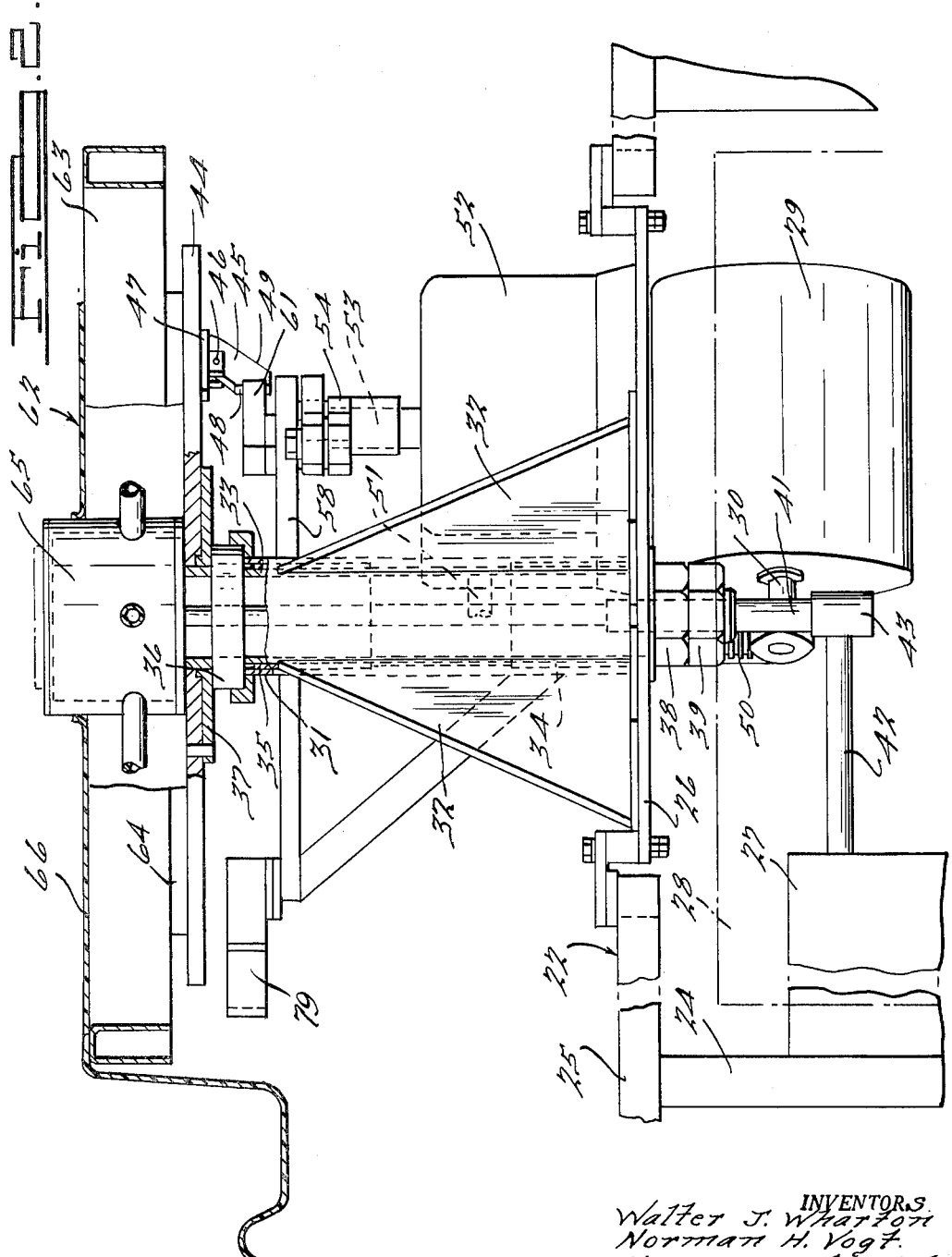

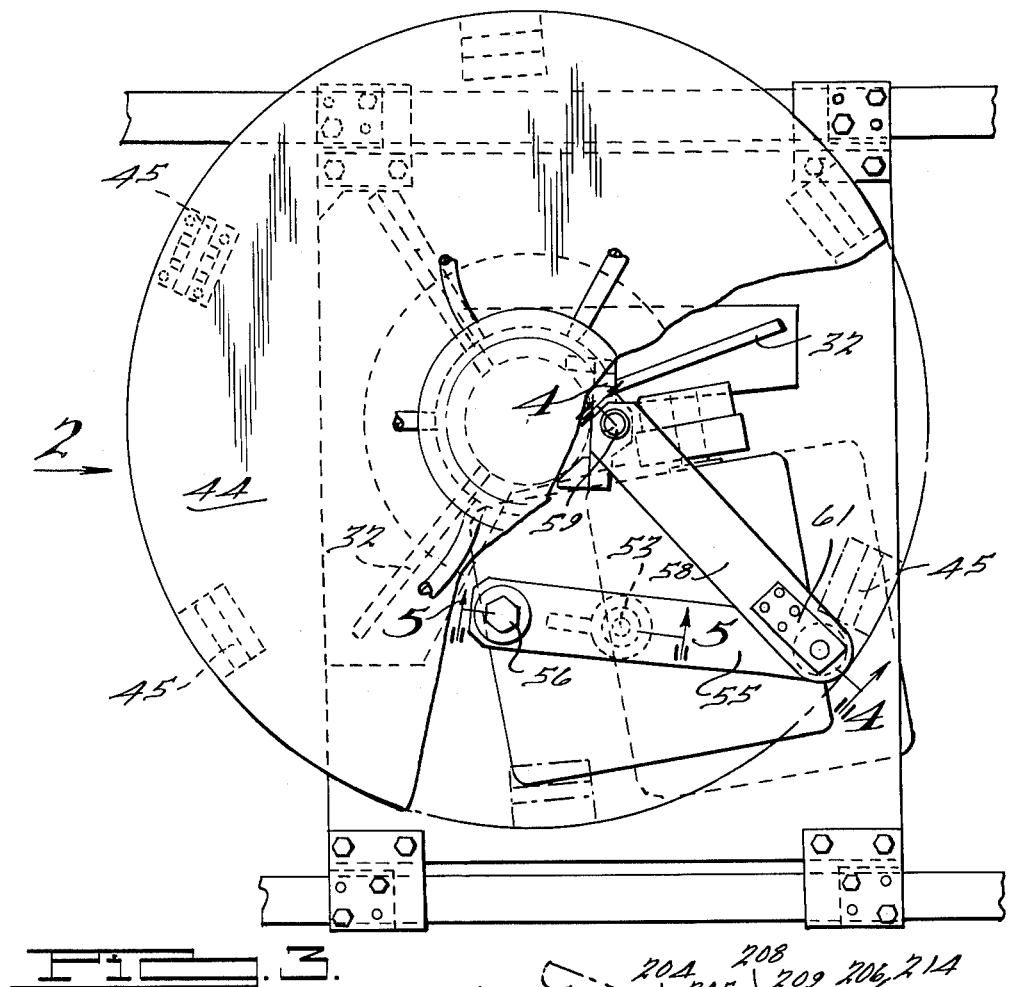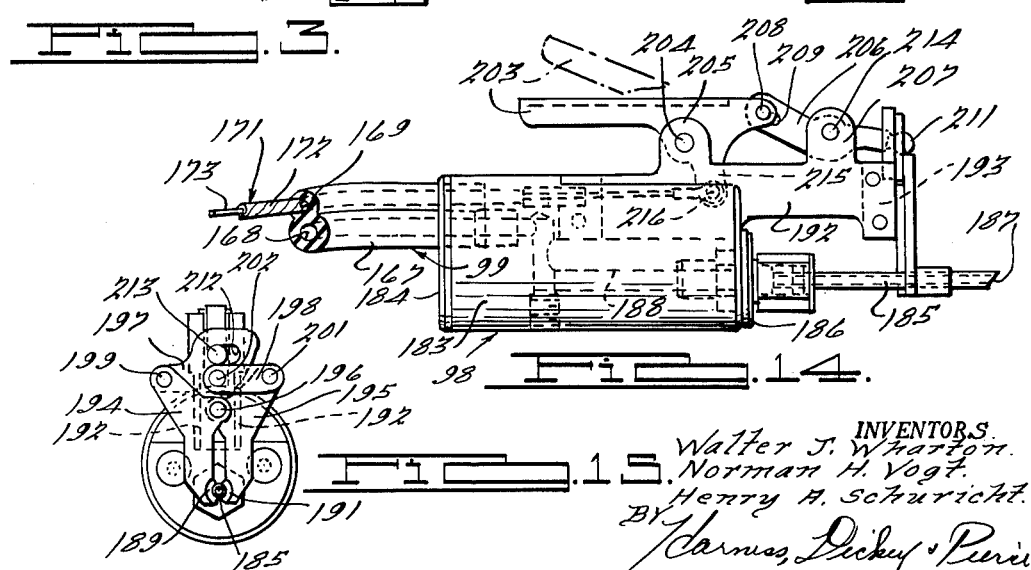

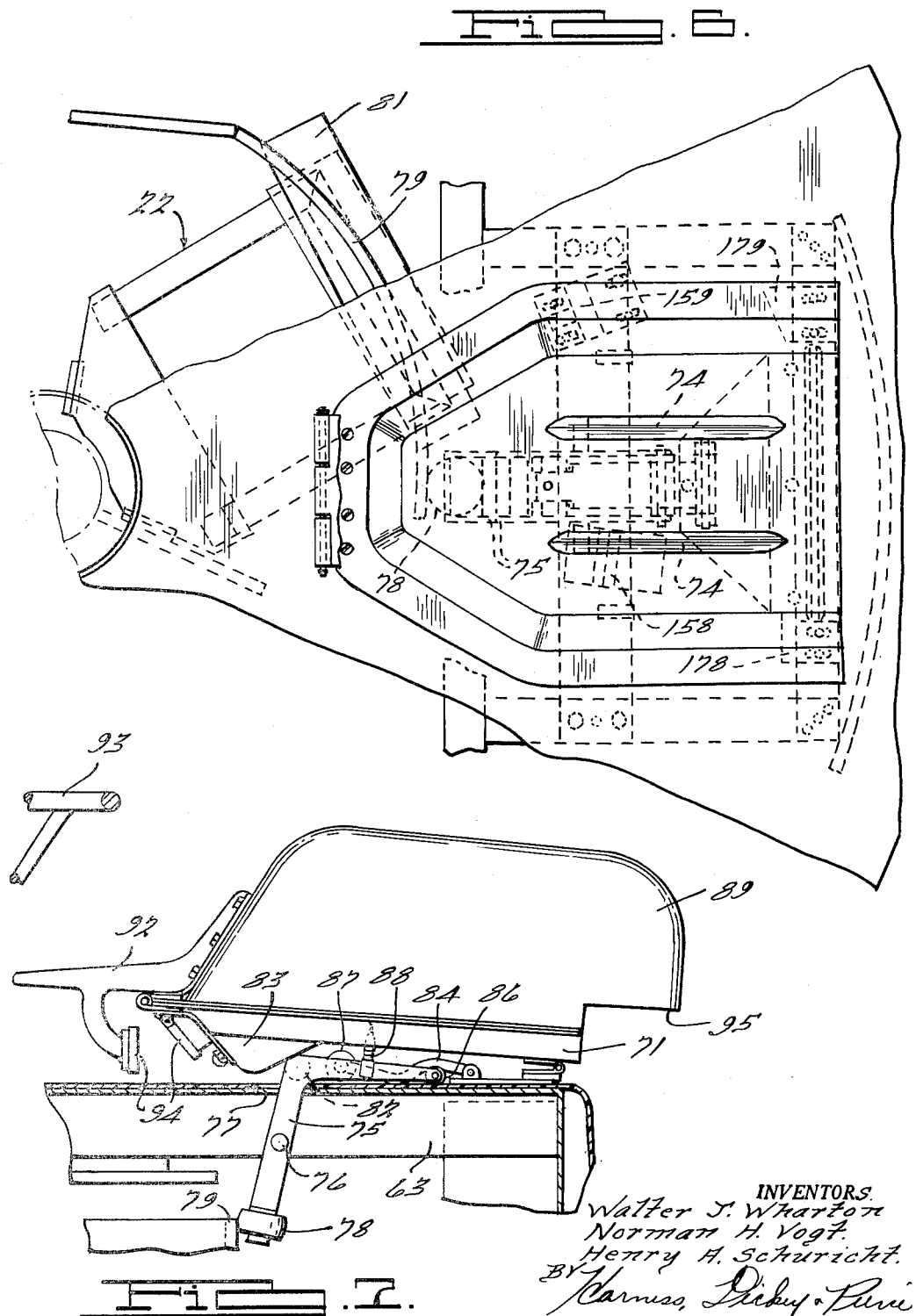

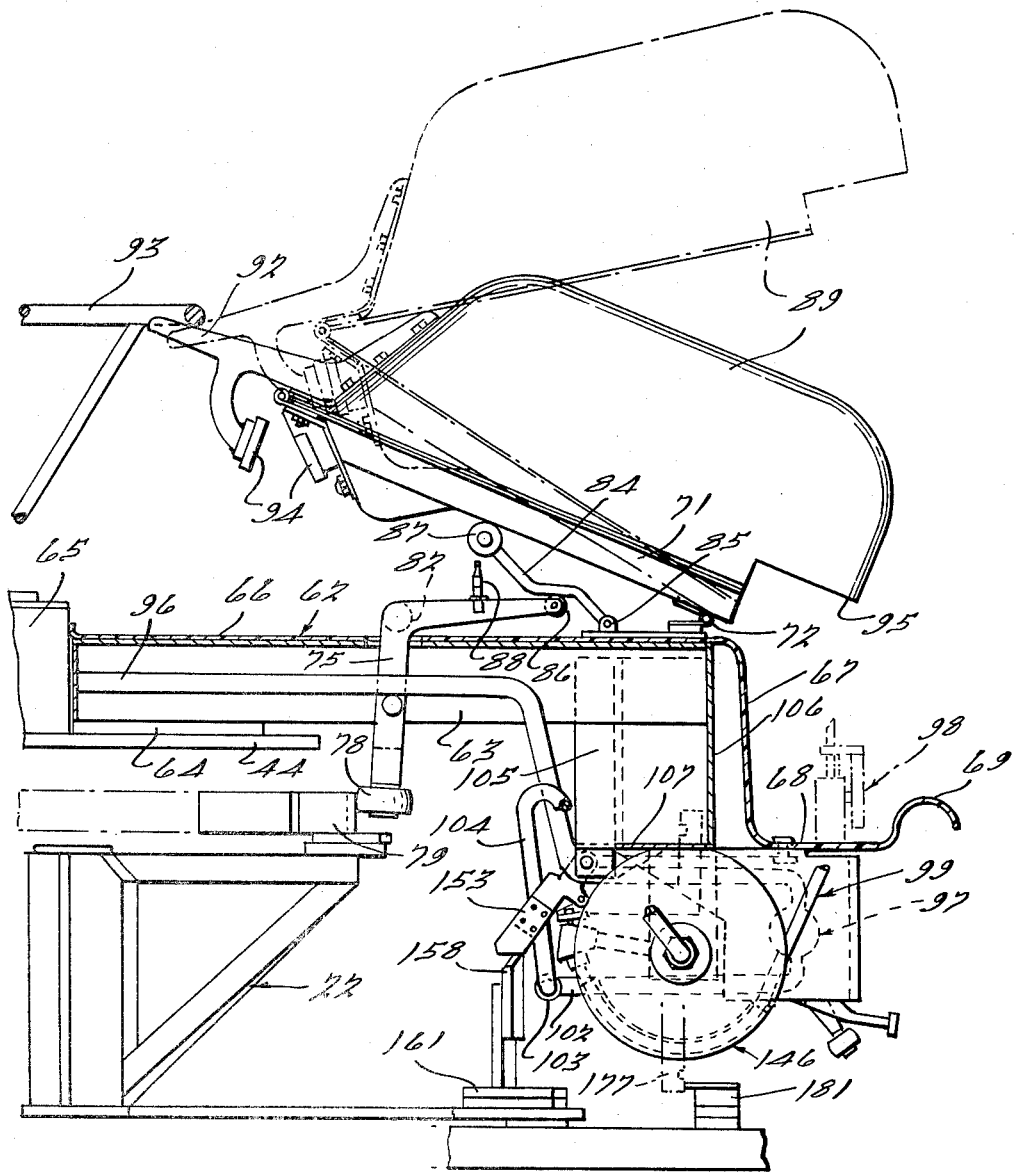

April 19, 1966  W. J. WHARTON ET AL  3,246,595
PICKLE INJECTOR
Filed May 19, 1961  7 Sheets-Sheet 6

INVENTORS
Walter J. Wharton
Norman H. Vogt
Henry H. Schuricht
BY Harness, Dickey & Pierce
ATTORNEYS

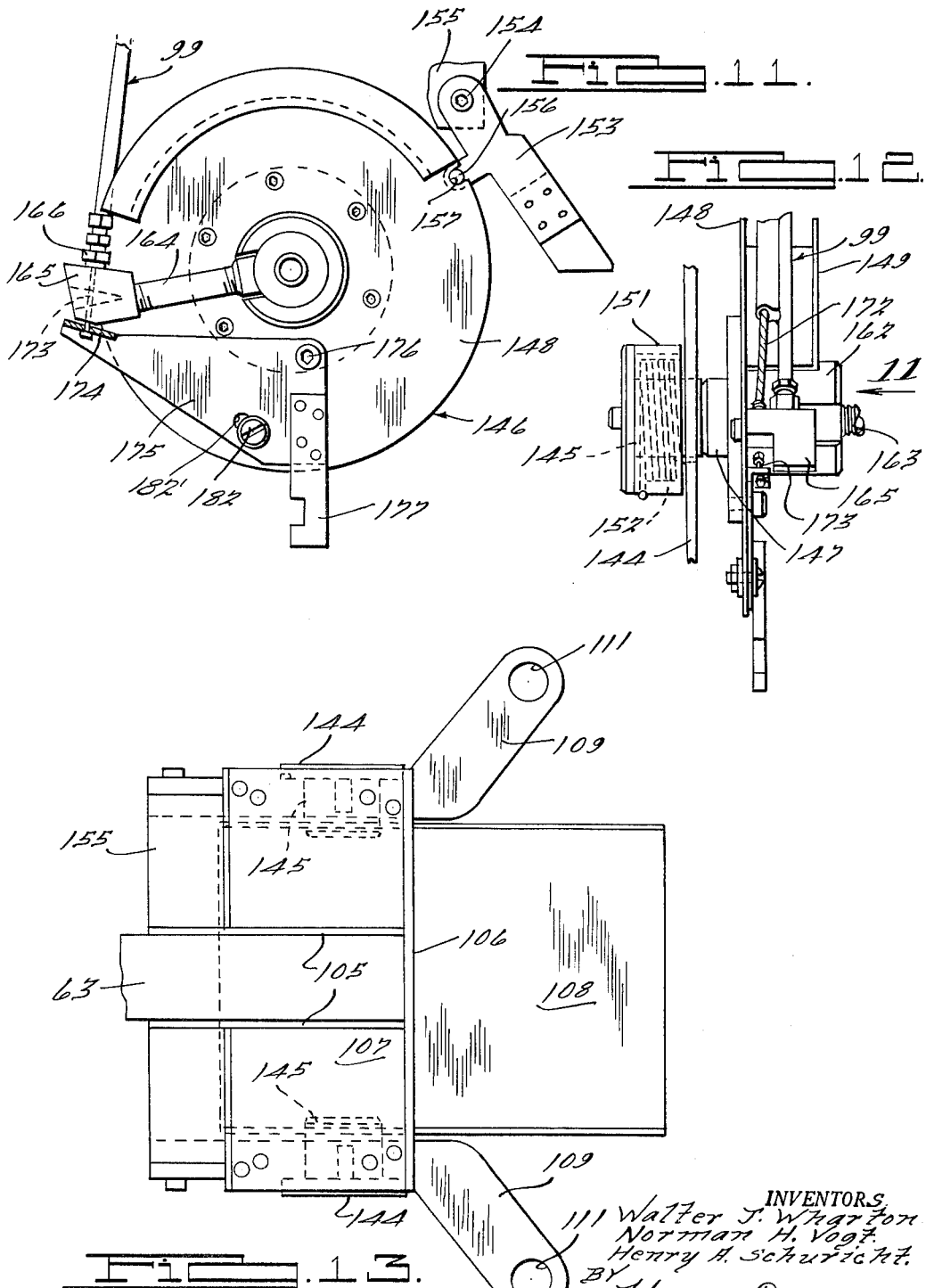

United States Patent Office 3,246,595
Patented Apr. 19, 1966

3,246,595
PICKLE INJECTOR
Walter J. Wharton, Pontiac, Norman H. Vogt, Clawson, and Henry A. Schuricht, Pontiac, Mich., assignors, by mesne assignments, to Taylor & Gaskin, Inc., Detroit, Mich., a corporation of Michigan
Filed May 19, 1961, Ser. No. 111,325
21 Claims. (Cl. 99—257)

This invention relates to pickle injectors, and more particularly to a method and means for injecting a preserving medium such as brine into ham arteries or other pieces of meat.

The methods and means heretofore employed for injecting brine or pickling solutions into meats such as hams, as part of a curing process, have had various drawbacks, which it is a general object of the present invention to overcome. Among such known systems are those utilizing a conveyor along which the hams are carried, each ham being removed in turn so that the brine may be injected into the vascular system and then replaced on the conveyor. Another method involves placing each ham on a scale and injecting the solution into the arteries until a predetermined percentage of weight increase is noted. Still another method involves a vertically reciprocating plate having downwardly extending needles which pierce the ham at spaced points, irrespective of the location of the arteries.

Among the disadvantages of previously known pickle injection methods have been the relatively slow operation and the necessity of a high injection pressure to conserve time, this high pressure often resulting in rupturing of the blood vessels and in incomplete distribution of the brine through the vascular system. The above-described needle method does not utilize the vascular system for distribution of the brine, and thus may result in the occurrence of unpickled areas or "gray" spots.

It is an object of the present invention to provide means for the injection of preservative solutions into pieces of meat which is extremely rapid and at the same time requires only a relatively low injection pressure, thus minimizing the possibility of blood vessel rupture and insuring even preservative distribution.

It is also an object to provide an improved pickle injection system of this nature which greatly reduces the number of operators required for a given output, and also minimizes the amount of time during which the operators are idle.

It is a further object to provide an improved ham pickle injection system of the above character in which the pickling solution may be simultaneously injected into both main ham arteries.

It is another object to provide an improved pickle injection system of this nature in which the amount of pickling solution injected into each piece of meat may be varied to suit requirements.

Other objects and advantages of the present invention will become apparent from the following detailed description taken in conjunction with the accompanying drawings.

In the drawings:

FIGURE 1 is a perspective view of a suitable embodiment of the invention, showing the various stations;

FIGURE 2 is a cross-sectional view in elevation of the central portion of the apparatus showing the locations of the brine tank and pump, driving motor and frame components;

FIGURE 3 is a top plan view of the central portion of the apparatus, showing the intermittent driving means, parts being omitted and broken away for clairty;

FIGURE 4 is a fragmentary cross-sectional view in elevation taken along the line 4—4 of FIGURE 3 and showing the construction of the table drive arm;

FIGURE 5 is a fragmentary cross-sectional view in elevation taken along the line 5—5 of FIGURE 3 and showing the connection between the crank arm and drive arm;

FIGURE 6 is a fragmentary plan view of the table at the location of the cams for actuating the needle release levers, hose retracting levers and tray tilting lever;

FIGURE 7 is a fragmentary side elevational view of a tray and cover along with the associated tray lifting linkage;

FIGURE 8 is a side elevational view in cross section of the table in the same vicinity as that of FIGURE 6 and showing the manner in which the tray is tilted and the cover lifted;

FIGURE 11 is a side elevational view of a hose reel taken in the direction of the arrow 11 of FIGURE 12 and showing the hose in its extended position together with the reel release lever and needle release lever;

FIGURE 12 is a front elevational view of the reel showing the retracting spring;

FIGURE 13 is a top plan view of the frame for supporting the reels and valve, showing the tray reinforcing ears;

FIGURE 14 is a side elevational view of the needle assembly; and

FIGURE 15 is a front end elevational view of the needle assembly.

Figure 9:
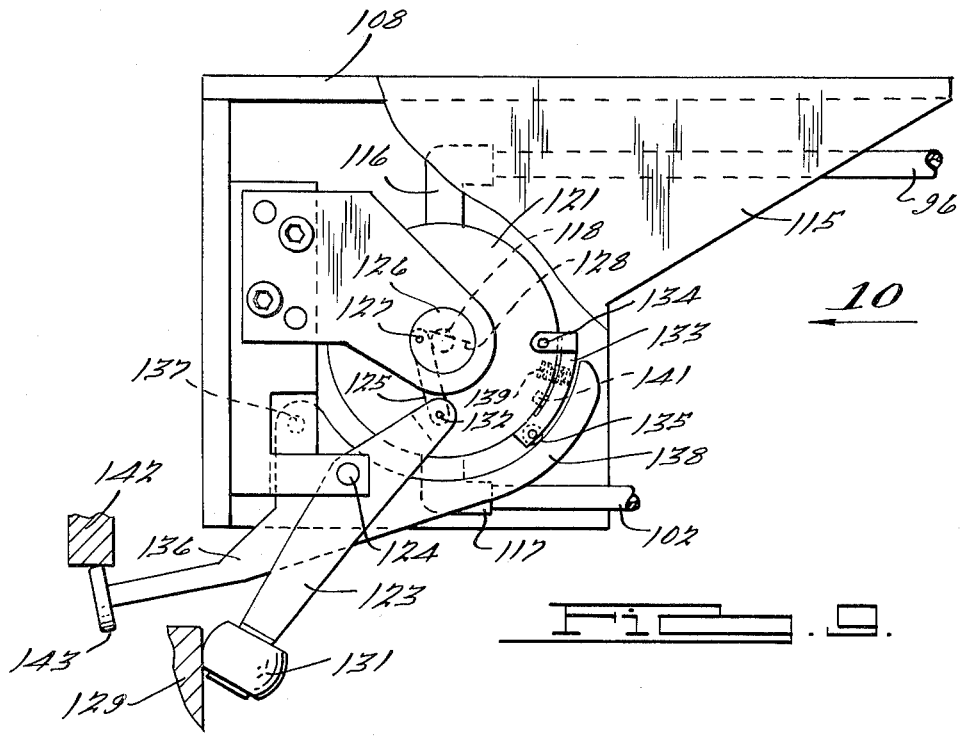
FIGURE 9 is a side elevational view of a timing valve and its setting mechanism for controlling the period of brine injection.

In general terms, the invention comprises a system for permitting pickle injection needles to be connected to ham or other meat arteries and the brine solution injected while the ham is in motion from a needle attaching station toward a ham discharge station. In the illustrated embodiment of the invention, a turntable is used having a plurality of ham receiving trays, a pair of needles being associated with each tray and movable with the turntable. One or both needles having been attached by an operator at the needle attaching station, a timing valve is automatically set to inject brine at relatively low pressure into the ham for a predetermined period. During this period, the turntable will rotate, so that succeeding trays will approach the needle attaching operator. After the brine has been shut off, each tray approaches a station at which the needles are automatically disconnected from the arteries and the hoses to which the needles are attached are retracted. Each tray is tilted to discharge its ham, and the tray may then approach the first station.

Referring more particularly to the drawings, the entire unit is generally indicated at 21 in FIGURE 1 and is of circular shape, having a stationary frame generally indicated at 22 and seen in FIGURE 2, this frame being enclosed by a plurality of arcuate cover plates 23, as seen in FIGURE 1.

Frame 22 comprises a plurality of spaced legs 24 and horizontal members 25 which support a central plate 26, as seen in FIGURE 2. A brine pump 27 and a supply tank 28 are disposed within frame 22 below plate 26, as is a turntable driving motor 29 having a horizontal output shaft 30. A stationary post 31 supported by spaced gusset plates 32 extends upwardly from plate 26 and rotatably supports a turntable supporting tube 33. More particularly, tube 33 is supported by radial bearings 34 and 35 within post 31, as well as by a thrust bearing 36 which surmounts post 31 and supports a circular plate 37 secured to the top of tube 33. The lower end of tube 33 extends below base plate 26 and is secured in place by nuts 38 and 39, and a brine supply conduit 41 which rotates along with tube 33 is centrally disposed within tube 33 and extends therebelow. Conduit 41 is connected to pump 27 by a conduit 42 leading from the pump, the latter conduit being connected to conduit 41 by a fitting 43 which permits rotation of conduit 41.

A circular turntable supporting plate 44 is centrally secured on plate 37, and a plurality of circularly spaced driving pawls 45 are secured beneath plate 44, one of these pawls being seen in FIGURE 2 while the entire set of six pawls are shown in dashed or dot-dashed lines in FIGURE 3. Each pawl comprises an angularly shaped plate, seen best in FIGURE 2, which is pivotally supported by a pin 46 between the downwardly extending ears of a bracket 47 secured to the underside of plate 44, these brackets 47 being equidistantly spaced. Each pawl 45 is so shaped as to have a normal position as seen in FIGURE 2 in which one face 48 of the pawl is engageable to drive plate 44 in a counterclockwise direction as seen in FIGURE 3. When the pawl is in this position, its opposite edge 49 is inclined so that engagement with edge 49 of a member moving in a clockwise direction in FIGURE 3 will merely tilt the pawl upwardly, permitting such member to pass under the pawl, after which the pawl will drop back to the position seen in FIGURE 2.

Driving motor 29 drives (through a belt 50) the input shaft 51 of a gear reducer 52 mounted on plate 26 as seen in FIGURE 2, the gear reducer having a vertically disposed output shaft 53. A crank arm 54 is secured to and extends outwardly from shaft 53, as seen in FIGURE 5, the outer end of this shaft being pivotally connected to one end of a link 55 by means of a pivotal connection 56. The other end of link 55, which is longer than crank arm 54 as seen in FIGURE 3, is connected by a pivotal connection 57 to the outer end of an oscillating arm 58, as seen in FIGURE 4, the inner end of arm 58 being secured to the frame by a stationary pivot 59. A push member 61 is secured to the upper surface of arm 58 adjacent its outer end, and the relative locations of the pivotal connections are such that upon each revolution of shaft 53 push member 61 will engage a pawl 45 and rotate turntable supporting plate 44 one-sixth of a revolution, returning under the next pawl 45 in preparation for the next shift of the turntable. An intermittent counterclockwise rotation (as seen in FIGURE 3) will thus be given to supporting plate 44, this rotation resulting in an advance of one-sixth of a full revolution for each full revolution of speed reducer output shaft 53.

A turntable generally indicated at 62 is mounted in spaced relation above supporting plate 44, as seen in FIGURE 2. More particularly, a plurality of radially disposed and equidistantly spaced turntable supporting beams 63 of inverted channel-shaped cross section are secured to supporting plate 44 by means of intermediate plates 64 mounted on plate 44, as seen in FIGURES 2 and 8. An upper brine distributing reservoir 65 of circular shape is centrally mounted on plate 44 and is connected with the upper end of conduit 41, beams 63 extending outwardly from reservoir 65 as seen in FIGURE 8, although the beams are removed for purposes of clarity in FIGURE 3.

Turntable 62 has a main flat portion 66 extending outwardly from reservoir 65 and resting on beams 64, as seen in FIGURES 2 and 8. A downwardly extending portion 67 extends from the outer edge of portion 66 past the outer ends of beams 63, and an annular needle supporting portion 68 of the tray extends outwardly from portion 67 as seen in FIGURE 8, an upwardly extending lip 69 being formed on the outer edge of portion 68. Tray 62 is preferably fabricated of plastic material or other material capable of being easily maintained in a sanitary condition.

Six meat supporting trays 71 are mounted on portion 66 of turntable 62, each tray being hinged at its outer end to the tray by a hinge 72, as seen in FIGURE 8. The shape of each tray 71 is perhaps best seen in FIGURE 6, the tray having an upwardly extending rim around three sides but being outwardly open, so that a piece of meat such as a ham 73 resting thereon, as seen in FIGURE 1, may be slid off tray 71 when the latter is tilted from its normal position as seen in FIGURE 7 to its discharge position as seen in dot-dash lines in FIGURE 8.

The normal position of each tray 71, seen in FIGURE 7, is such that the tray is tilted slightly outwardly to permit drainage, a plurality of ribs 74 being provided in the tray as seen in FIGURE 6 to facilitate such drainage. An L-shaped lever 75 has one arm pivoted at 76 within an intermediate portion of each beam 63, these levers extending through cutouts 77 in the beams and turntable. Each lever 75 is shown as actually being a double lever with two members in spaced parallel relation, as seen in FIGURE 6. The lower end of each lever 75 carries a cam follower 78 engageable with a cam 79 mounted on stationary frame 22, as seen in FIGURES 6 and 8. More particularly, cam 79 is supported by a plate 81 mounted on the frame, as seen in FIGURE 6. The elbow of lever 75 carries a stop member 82 which is engageable by a downward projection 83 at the inner end of the corresponding tray 71, as seen in FIGURE 7. This engagement takes place when lever 75 is in its normal or clockwise position, whereas when the lever is swung counterclockwise, it will cause tilting of tray 71.

The tilting is accomplished by means of a tilting lever 84 of somewhat S-shaped construction, as seen in FIGURES 7 and 8, this lever being pivotally connected to turntable 62 immediately rearwardly of hinge 72 by means of a pivot pin 85. Lever 84 overlies a roller 86 carried by the outer end of lever 75, and the inner end of lever 84 carries a roller 87 engageable with the underside of tray 71. Counterclockwise rotation of lever 75, caused by movement of roller 78 past a certain portion of cam 79, will thus cause tilting of the tray, the latter being seen in solid lines at an intermediate position in FIGURE 8 and in dot-dash lines in its full discharge position. Each lever 75 may carry a pointed retaining pin 88 extendable through an aperture (not shown) in tray 71 to hold ham 73 in position.

A cover 89, which may be fabricated of a transparent plastic material, is disposed over each tray 71 in order to prevent undue splashing when the brine is being injected into ham 73. Each cover is hinged at 91 to the rear of its tray 71, and has a rearward extension 92 attached thereto. Extension 92 is engageable with a ring 93 mounted above reservoir 65 when tray 71 approaches its fully tilted position, as seen in FIGURE 8, causing cover 89 to be lifted away from the tray and permitting the ham to be discharged. When the tray is returned to its normal position, as seen in FIGURE 7, its cover 89 will be held in opened position by a pair of magnets 94 mounted on extension 92 and tray 71 respectively, in order that another ham may be placed thereon and the injection needle or needles attached, after which cover 89 may be manually closed. Forward edge 95 of the cover is sufficiently above the level of tray 71 to permit the injection needles to be attached to the ham arteries, as later described.

The brine supply system to the needles is seen in FIGURE 8 and comprises six conduits or hoses 96 leading radially outwardly from reservoir 65, within beams 63, these hoses being connected to a timing valve generally indicated at 97 which is mounted beneath portion 68 of turntable 62 adjacent each pair of needle assemblies, these assemblies being indicated generally at 98. The positions of the pairs of needle assemblies are best seen in FIGURE 1, each assembly 98 being attached to a hose or conduit generally indicated at 99 which extends through a clearance aperture 101 in turntable portion 68. Six pairs of adjacent apertures 101 are provided in the turntable, each pair being beneath a tray 71 and being of sufficient size to permit extension or retraction of its conduit 99 but limiting the retracting movement of needle assembly 98 to the upright position shown in dot-dash lines in FIGURE 8. As is described below in further detail, a conduit 102 leading from the outlet of each timing valve 97 is connected to a T-connection 103, seen in FIGURE 8, from which two flexible hoses 104 lead the pickling solution to the two adjacent conduits 99.

A pair of parallel downwardly extending supporting brackets 105 are secured to the vertical legs of each beam 63 at the outer end thereof. A vertical plate 106 and a horizontal plate 107 are secured to plates 105, as seen in FIGURES 8 and 13, and a plate 108 is secured to the underside of plate 107 and extends outwardly therefrom, as seen in FIGURE 13. A pair of diagonally extending reinforcing plates in the form of ears 109 are also secured to plate 107, the outer ends of plates 109 having apertured portions 111 which underlie apertures 101 for the purpose of reinforcing these portions of the turntable.

Figure 10:
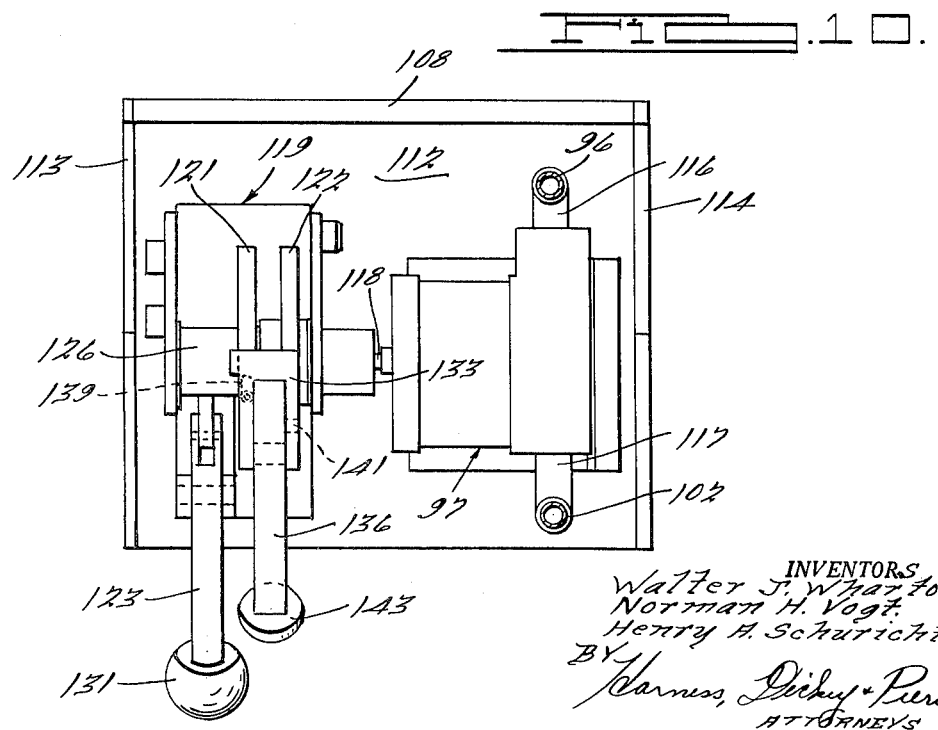
FIGURE 10 is a rear elevational view of the valve seen in the direction of the arrow 10 of FIGURE 9.

As seen in FIGURES 9 and 10, three plates 112, 113 and 114 extend downwardly from plate 108 to form a timing valve supporting frame, plates 113 and 114 having tapered rearward extensions 115 beneath plate 107 for reinforcing purposes. Timing valve 97 is secured within this frame and has an inlet connection 116 connected to conduit 96 and an outlet connection 117 connected to conduit 102. Valve 97 may be of a conventional type having a shaft 118 which, when would clockwise in FIGURE 9 beyond a certain point, will open the connection leading from port 116 to port 117, the time during which this connection remains open being set by partially returning shaft 118 in a counterclockwise direction to a predetermined position (thus setting a clock mechanism), the amount of time the valve is open being inversely proportional to the amount of return movement. An example of such a valve is the "Erie Time-O-Flow" valve manufactured by the Erie Manufacturing Company, 4000 South 13th Street, Milwaukee, Wisconsin, and shown on page 2 of their Catalog No. 233 A 38 A, issued before January 1961.

The means for winding and setting timing valve 97 comprises a setting mechanism generally indicated at 119 mounted within the frame which supports valve 97, as seen in FIGURES 9 and 10. The setting mechanism comprises a setting disk 121 and a connecting disk 122 in coaxial relation with shaft 118, disk 122 being secured to shaft 118 while disk 121 is independently rotatable. A setting lever 123 is pivoted at 124 to the frame and is connected by a link 125 to a hub 126 on disk 121, and more particularly to a pin 127 within a slot 128 on the hub, pin 127 being offset with respect to the hub axis. A stationary cam 129 positioned between stations I and II of the unit, as described more fully below, is engageable by a roller 131 carried by the outer end of lever 123 to rock lever 123 counterclockwise as seen in FIGURE 9. The relative locations of the pivotal connections are such that during the first portion of this counterclockwise movement of lever 123, disk 121 will be rotated clockwise in FIGURE 9, until the axis of pin 132 which connects levers 123 and 125 passes an imaginary line connecting the axes of pivots 124 and 127. Further counterclockwise movement of lever 123 past this point will draw link 25 downwardly in FIGURE 9, causing retraction of disk 121 in a counterclockwise direction. Cam 129 may be set so as to terminate this partial retraction at a predetermined point.

An interlocking member 133 is pivoted at 134 to the outside of disk 121, as seen in FIGURE 9, member 133 overlapping the edges of both disks as seen in FIGURE 10 and being of arcuate shape. Member 133 extends clockwise a short distance from pin 134, as seen in FIGURE 9, and its outer end carries a roller 135. A connecting lever 136 is pivoted at 137 within the frame which supports valve 97 and setting means 119, this lever being alongside lever 123. The portion 138 of lever 136 which extends toward disks 121 and 122 is of arcuate shape and is engageable with roller 135 to urge member 133 against the disk edges. A helical compression spring 139 is disposed within a recess in the edge of disk 121 and urges member 133 outwardly. Member 133 carries a projection 141 which is receivable in a notch in the edge of disk 122 when member 133 is held against the disk edges by lever 136 against the action of spring 139. A stationary cam 142 adjacent cam 129 is engageable with a roller 143 at the outer end of lever 136 to hold lever 136 in a counterclockwise position in FIGURE 9, thus interlocking disks 121 and 122.

As valve 97 and setting mechanism 119 approach Station II, rollers 131 and 143 will simultaneously engage their respective cams 129 and 142, the parts starting from the position shown in FIGURE 9, and disks 121 and 122 will rotate clockwise in FIGURE 9, the rotation of disk 122 being caused by the fact that it is interlocked with disk 121. Disk 122 being secured to shaft 118, valve 97 will therefore be opened. As disk 121 begins its counterclockwise retracting movement, as described above, disk 122 and shaft 118 will do likewise, until roller 131 drops off preadjusted cam 129, at which time the clock within timing valve 97 will have been set to its proper interval, and the valve will remain open until this time expires. At the same time, roller 143 will drop off cam 142, permitting spring 139 to lift member 133, thus disconnecting disk 122 from disk 121.

A pair of brackets 144 extend downwardly in parallel relation from each plate 107 and carry a pair of bearings 145 which support reel assemblies generally indicated at 146. Each reel assembly 146 comprises a hub 147 rotatably mounted in bearing 145 and extending outwardly therefrom (to the right as seen in FIGURE 12), and a reel 148 secured to hub 147, reel 148 comprising a disk carrying an arcuate member 149 of L-shaped cross-section on the outside thereof so as to form a channel extending about 90° around the disk. The channel is adapted to receive conduit 99 when the reel is moved to its retracted position as seen in FIGURE 8, this position being counterclockwise from the extended position shown in FIGURE 11. A spring housing 151 is secured to the inner end of hub 147 and surrounds bearing 145, this housing enclosing a torsion spring 152. One end of spring 152 is secured to stationary bracket 144, while the other end is connected to housing 151, the spring urging the housing in a direction such that hub 147 and therefore reel 148 will be urged counterclockwise from the position shown in FIGURE 11, that is, toward its retracted position.

A reel detent and release lever 153 is pivotally connected at 154 to a bracket 155 adjacent to each reel assembly 146. Detent lever 153 is urged by gravity toward a position as shown in FIGURE 11, in which a detent pin 156 carried by the lever is receivable by a notch 157 in the edge of disk 148 so as to hold the reel in its extended position. A pair of reel detent release cams 158 and 159 are stationarily mounted on a supporting plate 161 mounted on frame 22, as seen in FIGURES 6 and 8, these cams being preferably located a short distance after Station V in the illustrated embodiment. The cams are adapted to simultaneously lift the two levers 153 for each pair of reel assemblies 146 as these reel assemblies leave Station V, thereby permitting springs 152 to retract the reels.

Each reel is provided with a rotating union 162 on the outside thereof, the union having a stationary portion 163 adapted to be connected to the outlet end of a conduit 104, and a rotating portion having a rigid conduit 164 extending radially outwardly therefrom alongside disk 148. A head 165 is secured to the outer end of conduit 164, the head having an outlet port 166 adapted to be connected to hose 99.

The construction of hose 99 is perhaps best seen in FIGURES 12 and 14. The hose comprises a flexible and preferably liquid-impervious housing 167 having two parallel openings 168 and 169 respectively. Conduit or passage 168 may be termed the brine or pickle solution conduit, and is connected to conduit 164 through head 165. Opening 169 carries a flexible wire cable of the push-pull type generally indicated at 171 having an outer sheath 172 and an inner core 173. Sheath 172 is fixed to head 165 while core 173 extends through the head and is fixed to one end 174 of a bell crank lever 175 pivotally mounted at 176 on the outside of disk 148.

Lever 175 may be termed a needle release lever, and is movable counterclockwise from the position shown in FIGURE 11 to tension core 173 and release a needle clamp, as described in detail below. The mounting position of lever 175 on disk 148 is such that when the reel is in its extended position, the lower end 177 of lever 175 will extend downwardly as seen in solid lines in FIGURE 11 and in dot-dash lines in FIGURE 8. A pair of stationary cams 178 and 179 are mounted on frame 22 by means of a supporting plate 181, as seen in FIGURES 6 and 8, and are adapted to be simultaneously engaged by both levers 175 of a pair of reel assemblies 146 as they leave Station V. When so engaged, cams 178 and 179 will cause limited counterclockwise movement of levers 175 from the position shown in FIGURE 11, movement being limited by a stop 182 mounted on reel 148 and projecting through a slot 182' in each lever 175, the movement being limited by the length of the slot. As will be later seen, levers 175 are actuated just before reel release levers 153.

The construction of each needle assembly 98 is seen in FIGURES 14 and 15. The main portion 183 of each needle assembly is of generally cylindrical shape so as to enable the assembly to be manually grasped. The outer end of conduit 99 is secured to the end 184 of body 183 which is engageable with portion 68 of turntable 62 when the needle assembly is retracted as shown in FIGURE 8. A hollow needle 185 is secured to the opposite end 186 of body 183, this needle having a sharp tapered end 187 which adapts it for being inserted into a blood vessel. A conduit 188 extends through body 183 and connects brine passage 168 of conduit 99 with needle 185.

A pair of clamping members 189 and 191 are disposed on opposite sides of needle 185, as seen in FIGURE 15, these clamping members being of arcuate shape and being adapted to clamp the wall of a blood vessel to the needle. An extension 192 is mounted on body 183 in substantially parallel relation with needle 185, this extension comprising a pair of parallel plates having a connecting member 193 at their outer ends. A pair of levers 194 and 195 are mounted on member 193 by means of a common pivot 196, these levers being swingable in planes at right angles to the extent of needle 185 and carrying clamps 189 and 191 at their outer ends.

A toggle linkage comprising a pair of links 197 and 198 connect the ends of levers 194 and 195 opposite clamps 189 and 191, these connections being indicated at 199 and 201, respectively. Levers 194 and 195 are of angular shape, as seen in FIGURE 15, so that when the pivotal connection 202 between links 197 and 198 approaches an imaginary line connecting the centers of pivots 199 and 201, clamps 189 and 191 will be pressed against needle 185.

The means for actuating clamps 189 and 191 comprises a thumb-actuatable handle 203 pivoted at 204 to a pair of ears 205 extending upwardly from plates 192. A clamp actuating lever 206 is pivoted between a second pair of ears 207 on members 192 forwardly of handle 203, and the handle carries a pin 208 engageable in a slot 209 of lever 206. The forward end 211 of lever 206 is disposed within a slot 212 carried by an extension 213 on link 197, portion 211 of lever 206 being adjacent pivotal connection 202. The arrangement is such that when handle 203 is swung counterclockwise in FIGURE 14 to the position shown in that figure, the clockwise movement of lever 206 will cause expanding of toggle linkage 197, 198, thus bringing the clamps together against the needle.

When handle 203 is swung clockwise from the position shown in FIGURE 14 until pin 208 passes an imaginary line connecting the center of pivot 204 with the center of a pivot 214 for lever 206, handle 203 will stay in such position as shown in dot-dash lines in FIGURE 14. As lever 206 swings counterclockwise from the position of FIGURE 14, the outer ends of toggle levers 197 and 198 will be drawn toward each other, causing clamps 189 and 191 to swing away from needle 185.

Handle 203 has an extension 215 between members 192 which is connected to core 173 of cable 171 by means of a pivotal connection 216. When core 173 is shifted to the left in FIGURE 14 (due to tension exerted by lever 175 as described above), clamping members 189 and 191 will thus be opened and the blood vessel released from needle 185, so that the latter may be withdrawn.

In order to describe the operation of unit 21, the Roman numerals I through VI have been placed in FIGURE 1 to denote stations at which certain events occur as each tray 71 and its associated parts passes such station. An operator will normally stand at Station I, and as each tray approaches this station with its cover 89 held open by magnets 94, the operator will place a ham or other cut of meat on the tray, where it will be held in position by retaining pin 88. The operator will then grasp one needle assembly 98 and pull it upwardly from its retracted position until reel 148 has rotated sufficiently to permit pin 156 of lever 153 to drop into notch 157. This pulling force will be transmitted from needle assembly 98 to reel 148 through sheath 172 of the metallic flexible cable 171, the opposite ends of this sheath being secured to needle assembly body 183 and reel assembly head 165 respectively.

With clamps 189 and 191 in open position, the operator will then insert needle 187 into a blood vessel, and will press on handle 203 to cause clamps 189 and 191 to securely hold the blood vessel to the needle. If two needles are required for the brine injection, the other needle assembly 98 of the pair will be pulled out and attached in a similar manner. For standard ham operations, only one needle will normally be used, while other cuts of meat such as beef brisket, pork shoulders or picnic hams will usually require two needles. If only one needle is being used, the other needle of the pair may be disconnected from the brine system, for example, by disconnecting conduit 104 from T-connection 103. If this is done, the brine flow from this side of T-connection 103 would be stopped, for example, by using a conventional quick disconnect type of connection which includes an automatic shutoff valve when the parts are disconnected. Alternatively, a cam-controlled valve could be provided actuatable to open position only when its associated reel 148 is moved to its extended position.

After the needle or needles have been attached, the operator will press down on cover 89, separating magnet 94 and permitting the cover to drop into place. As tray 71 is shifted from Station I to Station II during the next movement of the turntable, rollers 131 and 143 of timing valve setting mechanism 119 will engage their respective cams 120 and 142. The counterclockwise movement of lever 136 in FIGURE 9 will cause disk 121 to be interlocked with disk 122. The counterclockwise movement of lever 123 will cause disk 121 to rotate clockwise in FIGURE 9 until timing valve 97 has been opened. Continued counterclockwise movement of lever 123 will cause counterclockwise movement of disk 121, setting the clock in valve 97 to the desired interval during which the valve is to remain open. When this setting has been reached, rollers 131 and 143 will drop off their respective cams.

Brine will begin to flow from tank 28 through pump 27, conduit 42, rotating connection 43, conduit 41, reservoir 65, conduit 96, valve 97, conduit 102, T-connection 103, one or both conduits 104 (depending on whether one or both needles is inserted), rotating connection 163, conduit 164, head 165, passage 168 in conduit 99, conduit 188 in needle assembly body 183 and needle 185 to the vascular system of the meat.

The turntable will continue to advance intermittently, and brine will be continually pumped into the meat until timing valve 97 closes. This may occur at any point during the movement of the meat, depending upon the timing valve setting. Normally, however, the brine flow will have been shut off by the timing valve before the meat reaches Station V.

While this movement is taking place, the operator at Station I will be free to continue loading pieces of meat on each succeeding tray as it reaches his station. Because of the substantial time during which the brine is permitted to be pumped into each piece of meat, the brine pressure may be set at a low enough magnitude to obviate the possibility of blood vessel rupture, and to insure even distribution of the brine throughout the vascular system.

As the tray leaves Station V, portions 177 of needle release levers 175 will simultaneously engage cams 178 and 179. This will cause counterclockwise pivotal movement of each lever 175 as seen in FIGURE 12, tensioning core 173 of cable 171. This in turn will pivot handle 203 clockwise in FIGURE 14, causing counterclockwise pivoting of lever 206. Toggle levers 197 and 198 will thus move in a direction causing clamps 189 and 191 to separate from the artery into which needle 187 is inserted.

Immediately after needles 185 are released, release levers 153 will engage cams 158 and 159, causing counterclockwise rocking movement of levers 153 as seen in FIGURE 11. Springs 152 will therefore be permitted to rotate reel assemblies 146 in a counterclockwise direction as seen in FIGURE 11 to their retracted position as seen in FIGURE 8. This will cause withdrawal of conduits 99 downwardly through apertured portions 101 of turntable portion 68 until needle assemblies 98 come to rest against this turntable portion.

When tray 71 is about half way between Stations V and VI, roller 78 on lever 75 will engage cam 79, causing counterclockwise rotation of lever 75 and therefore clockwise rotation of lever 84 as seen in FIGURE 8. This will cause tilting of tray 71 about hinge 72, and soon after this tilting begins, cover extension 92 will engage ring 93, causing cover 89 to lift away from tray 71. Needle 88 will be withdrawn from the meat by the tilting movement of the tray, and the meat will slide out of the tray onto a chute 217 as shown in dot-dash lines in FIGURE 1. Roller 78 will then drop off cam 79, permitting tray 71 to be reloaded at Station I.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination, a stationary frame, a turntable supported by said frame, means for rotating said turntable, a plurality of meat-supporting trays in circumferentially spaced relation on said turntable, at least one injector needle assembly mounted on said turntable adjacent each tray, said assembly including a needle adapted to be inserted into a blood vessel of a piece of meat, means for clamping each needle assembly to a piece of meat on its associated tray, said clamping means including members for clamping the wall of a blood vessel into which the needle is inserted to the needle, conduit means for supplying a preservative solution to each needle assembly when so attached, and means responsive to arrival of each tray at a predetermined angular position for unclamping its corresponding needle assembly, said means comprising cooperating elements on said turntable and frame coacting in response to said arrival of each tray at a predetermined angular position to cause movement of said clamping means from a clamping to an unclamping position.

2. The combination according to claim 1, further provided with a stationary preservative-containing tank adjacent said turntable, a central reservoir mounted on said turntable and connected with said tank, and branch conduits leading from said central reservoir to said needle assemblies.

3. The combination according to claim 1, each needle assembly being manually movable to an extended position, and means for moving each needle assembly to a retracted position in response to arrival of its corresponding tray at a predetermined angular position, said last-mentioned means including cooperating elements on said turntable and frame coacting in response to arrival of said corresponding tray at a predetermined angular position to retract the needle assembly, said means for unclamping said needle assembly being operable before said means for moving said needle assembly to its retracted position.

4. The combination according to claim 1, further provided with a timing valve in each conduit means settable to a position permitting flow of preservative to the needle assembly for a predetermined time, and means responsive to arrival of each tray at a predetermined angular position for opening its corresponding timing valve for said predetermined time.

5. In combination, a stationary frame, a turntable rotatably mounted on said frame, said turntable having a circular inner portion and an annular outer portion at a lower level than said inner portion, a plurality of trays mounted on said inner portion of the turntable and movable between meat-supporting and meat-discharging positions, at least one needle assembly carried by said turntable adjacent each tray, each needle assembly being movable between a retracted position on said outer turntable portion and an extended position clamped to a piece of meat carried by its corresponding tray, holding means for releasably holding the assembly in its extended position, and releasing means responsive to arrival of each tray at a predetermined angular position for releasing its corresponding needle assembly holding means.

6. The combination according to claim 5, further provided with means for supplying pressurized brine to each needle assembly, a valve in said supply means, and means responsive to movement of each tray past a predetermined station for opening its corresponding valve.

7. The combination according to claim 5, each needle assembly comprising a body of substantially elongated shape, one end of said body being adapted to rest on said lower turntable portion when the needle assembly is in its retracted position, a flexible conduit connected to said one body end, a needle extending from the other end of said body, and clamping means movably mounted adjacent said needle for securing a blood vessel thereto.

8. The combination according to claim 7, said clamping means being manually movable from a released position to a clamping position, and means responsive to arrival of each tray at a predetermined angular position for moving its corresponding clamping means to its released position.

9. In combination, a conveyor, means for supporting pieces of meat at spaced points on said conveyor, a plurality of brine injection needle assemblies carried by said conveyor at spaced points therealong, brine-supplying conduits carried by said conveyor and leading to the vicinity of each needle assembly, a presettable valve in each conduit, each valve being settable in response to movement past a predetermined position to permit a predetermined amount of brine to flow to its corresponding needle assembly, a flexible conduit connected between the outlet on each valve and its corresponding needle assembly, a reel supporting each flexible conduit, spring means urging each reel toward a position retracting said flexible conduit, a latch for releasably holding each reel in a position permitting said flexible conduit to be extended, and means responsive to movement of each reel past a predetermined position for retracting said releasable holding means.

10. The combination according to claim 9, each needle assembly being further provided with clamping means movable between clamping and unclamping positions, a flexible cable carried by said flexible conduit and connected at one end to said clamping means, a lever movably mounted on said reel and connected to the other end of said flexible cable, and stationary cam means engageable by said lever in response to movement of said reel past a predetermined position for shifting said flexible cable to move said clamping means to its unclamped position.

11. In combination, a conveyor, a plurality of trays mounted at spaced points on said conveyor and movable between meat-supporting and meat-discharging positions, a plurality of needle assemblies on said conveyor adjacent said trays and movable between clamped and unclamped positions, means for rotating said conveyor in one direction, each needle assembly being manually movable from its unclamped to its clamped position when its corresponding tray arrives at a first station, a brine supply system for said needle assemblies, a valve for each needle assembly, each valve being settable upon movement of its corresponding tray a predetermined distance past said first station to a position permitting a controlled amount of brine to flow to said needle assembly, means operative upon movement of each tray a further distance past said first station for moving the corresponding needle assembly to its unclamped position, and means operative upon movement of each tray a still further distance past said first station for shifting the tray from its meat-supporting to its meat-discharging position.

12. The combination according to claim 11, said trays being tiltable outwardly from their meat-supporting to their meat-discharging position, a cover for each tray, and means responsive to tilting movement of each tray to its meat-discharging position for lifting said cover.

13. The combination according to claim 12, further provided with magnetic means for releasably holding each cover in its lifted position after each tray has been returned to its meat-supporting position.

14. The combination according to claim 11, said trays being tiltable outwardly from their meat-supporting to their meat-discharging position, and brine-deflecting cover means over said trays.

15. In combination, a stationary frame, a turntable rotatably mounted on said frame, a plurality of trays mounted on said turntable and tiltable between meat-supporting and meat-discharging positions, a stationary brine tank and pump, a central reservoir carried by said turntable and connected to the outlet of said pump, conduits extending radially from said central reservoir, a timing valve mounted beneath the turntable adjacent each tray and connected to said radially extending conduits, a pair of reels adjacent each timing valve, a flexible conduit mounted on each reel, a needle assembly secured to the outer end of each flexible conduit and movable to an extended position along with its connected flexible conduit, means on each needle assembly for clamping the assembly to a piece of meat on its corresponding tray, means connecting the outlet of each timing valve to the two adjacent flexible conduits, spring means urging each reel toward a retracted position, a latch for releasably holding each reel in its extended position, means for periodically indexing said turntable a distance equal to the angular distance between trays, means responsive to movement of each tray past a first station for causing its corresponding timing valve to open, a lever pivotally mounted on each reel, a flexible cable connected between said lever and the corresponding needle assembly clamping means, means responsive to movement of each tray a further distance past said first station for shifting said lever and causing said flexible cable to shift said clamping means to its unclamping position, means responsive to movement of each tray a slight further distance for releasing the corresponding reel holding means and permitting retraction of the reel, flexible conduit and needle assembly, means responsive to movement of each tray a still further distance for tilting the tray to its meat-discharging position, and means responsive to movement of each tray a still further distance for returning the tray to its supporting position.

16. In combination, a turntable, means for rotatably indexing said turntable, a plurality of meat-supporting trays in circumferentially spaced relation on said turntable, at least one injector needle assembly mounted on said turntable adjacent each tray, means for clamping each needle assembly to a piece of meat on its associated tray, conduit means for supplying a preservative solution to each needle assembly when so attached, means responsive to arrival of each tray at a predetermined angular position for unclamping its corresponding needle assembly, means for supplying a preservative solution to each needle assembly, a flexible conduit connected between each needle assembly and its supply means, a reel supporting said flexible conduit rotatable between extended and retracted positions, and reel holding means for releasably holding said reel in its extended position.

17. The combination according to claim 16, further provided with spring means urging said reel to its retracted position, and means responsive to arrival of each tray at a predetermined angular position for causing its corresponding reel holding means to move to a released position permitting said spring means to retract said reel.

18. In combination, a turntable, means for rotating said turntable, a plurality of meat-supporting trays in circumferentially spaced relation on said turntable, at least one injector needle assembly mounted on said turntable adjacent each tray, means for clamping each needle assembly to a piece of meat on its associated tray, conduit means for supplying a preservative solution to each needle assembly when so attached, means responsive to arrival of each tray at a predetermined angular position for unclamping its corresponding needle assembly, each of said trays being movable between a meat-supporting position and a meat-discharging position, and means responsive to arrival of each tray at a predetermined angular position for shifting the tray from its meat-supporting position to its meat-discharging position.

19. In combination, a stationary frame, a turntable rotatably mounted on said frame, said turntable having a circular inner portion and an annular outer portion at a lower level than said inner portion, a plurality of trays mounted on said inner portion of the turntable and movable between meat-supporting and meat-discharging positions, at least one needle assembly carried by said turntable adjacent each tray, each needle assembly being movable between a retracted position on said outer turntable portion and an extended position clamped to a piece of meat carried by its corresponding tray, holding means for releasably holding the assembly in its extended position, releasing means responsive to arrival of each tray at a predetermined angular position for releasing its corresponding needle assembly holding means, a flexible conduit connected to each needle assembly, means for supplying brine to said conduits, and a reel for each conduit disposed beneath said turntable, said holding means comprising a detent for holding each reel in its extended position, said releasing means comprising a stationary cam engageable by said detent.

20. In combination, a stationary frame, a turntable rotatably mounted on said frame, said turntable having a circular inner portion and an annular outer portion at a lower level than said inner portion, a plurality of trays mounted on said inner portion of the turntable and movable between meat-supporting and meat-discharging positions, at least one needle assembly carried by said turntable adjacent each tray, each needle assembly being movable between a retracted position on said outer turntable portion and an extended position clamped to a piece of meat carried by its corresponding tray, holding means for releasably holding the assembly in its extended position, releasing means responsive to arrival of each tray at a predetermined angular position for releasing its corresponding needle assembly holding means, each needle assembly comprising a body of substantially elongated shape, one end of said body being adapted to rest on said lower turntable portion when the needle assembly is in its retracted position, a flexible conduit connected to said one body end, a needle extending from the other end of said body, clamping means movably mounted adjacent said needle for securing a blood vessel thereto, said clamping means being manually movable from a released position to a clamping position, and means responsive to arrival of each tray at a predetermined angular position for moving its corresponding clamping means to its released position, said last-mentioned means comprising a flexible cable extending from below said turntable to said clamping means, said clamping means being movable to its released position in response to tensioning of said cable.

21. In combination, a stationary frame, a turntable rotatably mounted on said frame, said turntable having a circular inner portion and an annular outer portion at a lower level than said inner portion, a plurality of trays mounted on said inner portion of the turntable and movable between meat-supporting and meat-discharging positions, at least one needle assembly carried by said turntable adjacent each tray, each needle assembly being movable between a position released from a piece of meat on its corresponding tray and a clamped position attached to a blood vessel of such piece of meat, clamping means for releasably clamping each needle assembly in its clamped position, and releasing means responsive to arrival of each tray at a predetermined angular position for releasing its corresponding needle assembly clamping means, said last-mentioned means comprising a flexible cable extending from below said turntable to said clamping means, said clamping means being movable to its released position in response to tensioning of said cable.

References Cited by the Examiner
UNITED STATES PATENTS

| | | | |
|---|---|---|---|
| 717,720 | 1/1903 | Schofield | 141—151 X |
| 1,737,069 | 11/1929 | Barber | 107—1.9 |
| 1,783,898 | 12/1930 | Barry | 99—254 |
| 2,088,257 | 7/1937 | Beisser | 99—256 |
| 2,234,686 | 3/1941 | Walter | 99—256 |
| 2,349,303 | 5/1944 | Pelosi | 141—329 |
| 2,528,204 | 10/1950 | Zwosta | 99—159 |
| 2,549,924 | 4/1951 | Olien et al. | 99—159 |
| 2,625,119 | 1/1953 | Jennings | 107—1.9 |
| 2,821,901 | 2/1958 | Abrams | 99—257 |

FOREIGN PATENTS

| | | |
|---|---|---|
| 352,185 | 7/1931 | Great Britain. |

ROBERT E. PULFREY, *Primary Examiner.*

H. LORD, JEROME SCHNALL, *Examiners.*